Patented Sept. 24, 1946

2,408,001

UNITED STATES PATENT OFFICE 2,408,001

GAIN-CONTROL SYSTEM FOR SEISMIC AMPLIFIERS

Edwin J. Shimek and William B. Hemphill, Dallas, Tex., assignors, by mesne assignments, to Socony-Vacuum Oil Company, Incorporated, New York, N. Y., a corporation of New York Application April 14, 1945, Serial No. 588,350

9 Claims. (Cl. 177—352)

This invention relates to electric seismographs, more particularly to a method and apparatus for controlling the gain in amplification through the period of time during which seismic waves created in the earth's surface are being detected and amplified, and has for an object the provision of a system in which interference with recordation by spurious signals is minimized.

In seismic prospecting systems a charge of dynamite, located in a shot hole, is detonated to produce seismic waves which are reflected from interfaces located below the earth's surface. These reflected waves are attenuated by their travel through the underground strata. The deeper the interface, the less is the amplitude of the reflected waves although, of course, the particular character of the interface or of the adjoining subsurface strata also plays a part in determining the amplitude of the waves. Though the reflected waves are of primary interest, the direct traveling waves are also received by the wave detector or geophone. It is desirable to utilize the instant of first arrival of the direct traveling waves, of large amplitude, for certain calculations. More specifically, a seismogram consists of the recorded waves together with a series of timing lines. These seismograms are interpreted in terms of time intervals and in terms of the patterns of the waves themselves. Each reflection presents its own typical pattern and from these data the depth of the underlying interfaces or substrata may be calculated in manner understood by those skilled in the art.

The times of arrival of the direct traveling waves at each of the several detectors or geophones, generally known as the spread, are determined by the first movements of the respective oscillographic elements. In other words, the galvanometer or oscillographic elements should be at standstill prior to the receipt of the first of the direct traveling waves. The time of arrival of such first wave is ascertained by the beginning of the movement of the oscillographic element, or the light beam, from its neutral position.

In order to increase the accuracy with which the initial movement of the galvanometer may be ascertained, it has been customary to have the amplifier set at maximum gain. This produces a sharp break or movement and minimizes the need to estimate the precise instant at which the oscillographic elements start to move. It has been found that any spurious noise or signals which might occur just prior to the instant of arrival of the direct traveling waves may so blend with the signals produced by the direct traveling waves as to give erroneous records of the "first breaks."

In accordance with the present invention, the effect of spurious signals has been to large degree eliminated by providing a system in which the amplifier is preset for an intermediate sensitivity or amplification. By the initial reduction in the amplification or the sensitivity of the recording system, the effect of spurious signals is to large degree eliminated without losing the benefit of relatively high gain or amplification of the first of the direct traveling waves. Immediately upon recordation of the first break, the sensitivity of the amplifier is quickly reduced to a predetermined minimum value and then increased to a maximum value as a function of time, whereby the recorded amplitudes of the reflected waves are maintained substantially constant.

Further in accordance with the invention, an automatic volume control is provided which is effective over a portion of the period during which expansion of the amplification is taking place.

For a more detailed description of the invention and for further objects and advantages thereof, reference should be had to the following detailed description taken in conjunction with the accompanying drawings, in which.

Figure 1:
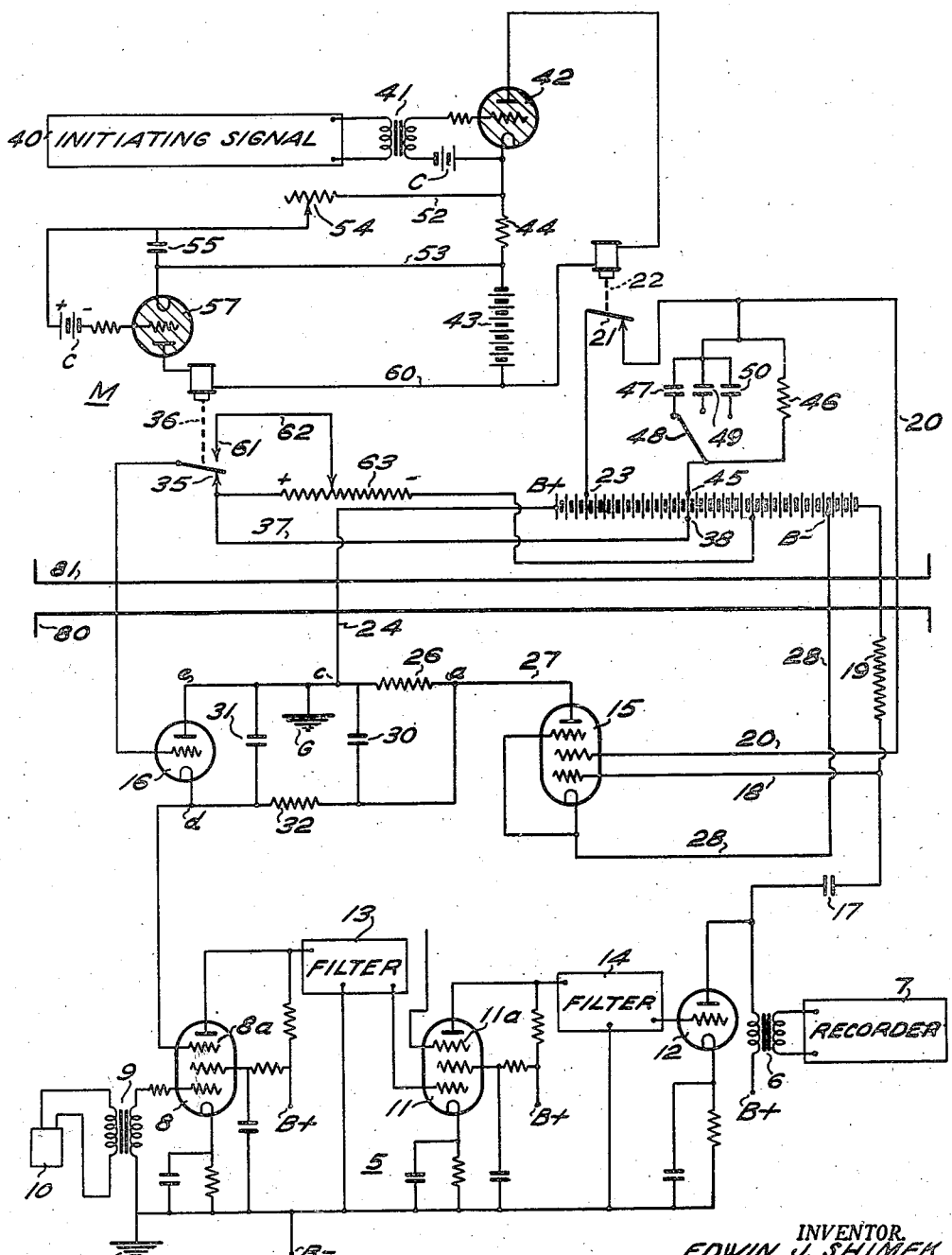
Fig. 1 is a wiring diagram of a typical embodiment of the invention.

Referring to the drawings, the invention in one form has been shown as applied to the control of an amplifier 5 having an output transformer 6 connected to suitable recording apparatus as indicated by the "Recorder" 7. One stage, or tube 8, of the amplifier has been illustrated as a pentode type of tube provided with an input circuit, including the secondary winding of a transformer 9, the primary winding of which is connected to a seismic wave detector in the form of a geophone 10. Generally there is a separate amplifier, of more or less conventional design, for each of the several detectors or geophones of the spread. Each amplifier may include additional stages such as valves or tubes 11 and 12, with filters 13 and 14 interposed therebetween. The several amplifiers may be simultaneously controlled from a master controller M in the same manner as will now be described for the amplifier 5.

The gain of one or more tubes, such as tubes 8 and 11, is controlled by the application of a suitable negative bias on the suppressor grids 8a and 11a. This gain-controlling bias is established between the point d, connected to grid 8a, and the point e, at ground potential, of the controller which includes an electric valve or amplifier tube 15, shown as of the pentode type, and a second electric valve or triode tube 16. The output from the amplifier 5 is applied by capacitor 17 and conductor 18 to the control grid of the pentode 15. This control grid is included in a circuit for negatively biasing it, with reference to the cathode, for operation in manner such that some anode current will flow in the absence of signals applied from the amplifier 5. This biasing means includes a resistor 19 and the right-hand portion of the battery illustrated as the source of anode potential.

As shown, the screen grid of the pentode 15 is connected by way of conductor 20 and the contact 21 of a high speed relay 22 to the point 23 on the battery, for application of a substantially normal screen grid voltage thereto. The suppressor grid is connected in conventional manner to the cathode. The current flows in the anode circuit from B+ of the battery by way of conductor 24, resistor 26, conductor 27, from anode to cathode of pentode 15, and by conductor 28 to the point on the battery marked B—. This flow of current through the resistor 26 produces an IR drop or potential difference between the points a and c of the circuit.

Current also flows through a filter network comprising capacitors 30 and 31 and a resistor 32. It will be observed the triode 16 has its cathode connected to the output side of the filter 30—32 while its anode is connected to ground G and to the positive or B+ side of the battery. The control grid of the triode 16 is connected through the contact 35 of a relay 36, and by conductor 37 to a point 38 on the battery which is less positive than the connection to the battery of the anode of triode 16.

It is to be further observed the cathode of the triode 16 is connected through the resistor 32 and the pentode 15 to B— of the battery, a point more negative (or less positive) than the control grid thereof. Thus, as far as triode 16 is concerned, conditions are established for conduction of current. Therefore, there will be current flow through the triode 16.

The voltage applied to the suppressor grid 8a, of the amplifier tube 8, will be the voltage between the point d and ground G of the controller. This voltage ($E_{de}$) may be expressed by the following equation:

$$E_{de} = E_{ac} - IR_{32}$$

where $E_{ac}$ is the voltage across the resistor 26, $R_{32}$ is the resistance of the resistor 32, and I is the current flowing through resistor 32.

Initially the voltage $E_{de}$ applied to the suppressor grid, or gain-controlling bias, has a magnitude such as to produce pre-suppression of the amplification; that is, this gain-controlling bias reduces the gain of the amplifier 5 to an intermediate value somewhat below the maximum gain thereof.

In accordance with the invention, this gain-controlling bias which produces the pre-suppression or intermediate value of the amplification, is substantially independent of the magnitude of signals applied to the control grid of the pentode 15. For example, if spurious signals are applied by the geophone 10 or are induced in the circuits by stray fields, or should they arise from any other source, the output of the pentode 15 will increase. For an increased output there will be a greater potential difference across the resistor 26 which will in turn tend to increase the current through resistor 32 in the direction from d to a, this circuit including the triode 16. The increased current flow, however, increases the potential difference $IR_{32}$, which potential difference is of opposite polarity, to $E_{ac}$. Therefore $IR_{32}$ compensates for the rise in voltage across resistor 26 and $E_{de}$ remains constant. The foregoing will be apparent upon consideration of the foregoing equation. It will, therefore, be seen that the value of the suppressor grid voltage $E_{de}$ will be independent of the signal strength and of the resultant change in the output of the tube 15 for the operating condition thus far described. The grid voltage or bias $E_{de}$ may be applied to suppressor grid 11a of tube 11 as well as to grid 8a; or the grid 11a may be connected in conventional manner, or to other gain-controlling means.

The magnitude of the initial gain-controlling bias may be varied or selected by adjustment of the dependent variables, the resistance values of the resistors 26 and 32, and the operating point on the characteristic curve of the triode 16. In other words, the voltage or bias between the points d and e may be made to assume any desired magnitude.

The pre-suppression or reduction of amplification to an intermediate value provides the operating advantage in that before the shot instant, the gain of the amplifier is reduced enough to eliminate the effect of many noises or electrical disturbances of relatively low amplitude. This means that the galvanometer trace will remain quiet because these low amplitude disturbances will not be amplified sufficiently to cause a material or bothersome movement of the trace. A quiet galvanometer trace increases the accuracy with which the first break may be determined because it may be assumed with confidence that the true first break occurs at the very beginning of movement of the galvanometer trace. Moreover, the input signal applied to the amplifier 5 will be of large magnitude as compared with any noise or spurious disturbance of relatively low magnitude, thus producing a sharp and distinctive record of the first break.

As explained in Shimek Patent No. 2,317,334, there may be provided a means for producing a voltage impulse coincidentally with the instant of explosion of the charge. This impulse, of substantial magnitude, corresponds with the instant of creation of the seismic waves. As the dynamite comprising the shot is detonated, this impulse is produced and is immediately applied to the input circuit of the pentode 8 or directly to the recorder 7. Sometimes an uphole geophone, adjacent the shot hole, may also be arranged to apply its output directly to the recorder, as shown in said Shimek patent. The additional details of these circuits have not been disclosed herein for the sake of simplicity.

Either the impulse indicative of the shot instant, or the arrival of the direct traveling waves at the uphole geophone, may be utilized as the "initiating signal" 40 of the master controller M shown in Fig. 1. The initiating signal is applied as indicated at 40 in Fig. 1, to a transformer 41 and to the input circuit of a gas tube or grid-controlled rectifier 42. This gas tube 42 may be of the type known on the market as a "Thyratron." It has a characteristic such that if the grid is negatively biased, as by the battery C, it will not conduct current. However, upon the application by the transformer 41 of a voltage which sufficiently reduces the negative bias (or applies a positive bias), the grid loses control and the tube 42 becomes conductive. When this occurs, current flows from the source of supply indicated by the battery 43 by way of the operating coil of the relay 22, through the gas tube 42, a resistor 44, and to the other side of the source of supply 43. The relay 22 is of the high speed type and immediately upon flow of current through the gas tube 42 the relay 22 opens its contact 21. The result of the opening of contact 21 is to transfer the connection of the screen grid of pentode 15 from the point 23 on the battery to the point 45, which transfer is in the direction for the supply of less voltage to the screen grid.

However, the screen grid voltage is not immediately reduced because there is included in the circuit a resistor 46 and a capacitor 47. This parallel R-C combination produces a gradual, logarithmic decrease in the screen grid voltage. The rate of decay of this voltage may be readily adjusted by varying the value of the resistor 46 or by movement of a selector switch 48 to connect one of additional capacitors 49 and 50, of differing size, in the R-C circuit combination.

After the recordation of the shot instant, it is desirable to record the instant of arrival of the direct traveling waves at the respective geophones. However, these waves are of large amplitude and it is, therefore, necessary greatly to reduce the gain of the amplifier immediately after their arrival. It will be remembered that the current through the Thyratron 42 flowed through the resistor 44. The potential difference or voltage across this resistor 44 is applied by conductors 52 and 53 to another R-C combination comprising a variable resistor 54 and a capacitor 55. After a predetermined time interval, determined by the values of this R-C combination, the capacitor 55 is charged to reduce the negative bias applied by a bias battery C to the control grid of a gas tube or Thyratron 57. Hence, immediately after arrival of the direct traveling waves at the geophone 10, the Thyratron 57 fires and current flows from the source or battery 43 by way of conductor 60, operating coil of the relay 36, through the Thyratron 57, and by way of conductor 53 to the other side of the battery.

The relay 36 is also a high speed relay which operates immediately to transfer the connection of the control grid of the triode 16 to the contact 61 of the relay 36. The contact 61 is connected by conductor 62 to a potentiometer 63 which greatly increases in a negative direction the bias between the grid and the anode of triode 16. This decreases its conductivity and hence increases the negative voltage $E_{de}$ applied between the suppressor grid $8a$ and the cathode of pentode 8. The extent of the increase in this negative gain-controlling bias is directly controlled by the setting of the potentiometer 63. It may be adjusted from zero to a maximum negative value adequate to render the triode 16 non-conductive. If the potentiometer 63 is set for a negative voltage which does not make the tube non-conductive, the aforesaid compensating effect, $(E_{ac}-IR_{32})$ will still be present; that is, signals applied to the control grid of the pentode 15 will not affect the new value of the gain-suppressing bias $E_{de}$.

While the foregoing has been taking place, it will be remembered that the screen grid voltage of the pentode 15 has been decreasing due to the decay of the voltage across the R-C combination 46—47. The decrease in the screen grid voltage decreases the conductivity of the pentode 15. Consequently, the voltage $E_{ac}$ decreases and this, of course, reduces the current flowing through the resistance 32. As these voltages are reduced, a point is reached at which the triode 16 becomes non-conductive; that is, for the value of the negative bias on the grid, the difference in potential between the anode and cathode of triode 16 is insufficient for current flow. Thereafter, the gain-suppressing bias $E_{de}$ decreases with the decrease in potential or bias on the screen grid of the pentode 15. As the gain-controlling bias $E_{de}$ decreases, from a maximum negative value to lesser negative values, the gain of the amplifier increases.

As soon as the triode 16 becomes non-conductive, the aforesaid compensating effect disappears. Therefore, during the subsequent increase of gain, the signals applied to the control grid of the pentode 15 also control its output. This output is filtered by the filter 30—32 and the resultant potential, of course, is applied to the suppressor grid $8a$ of the pentode 8. If the signals applied to the pentode 15 increase in amplitude the negative bias is correspondingly increased and vice versa. Thus the operation is similar to conventional automatic volume control systems but differs therefrom in that the pentode 15 serves as an automatic volume control during the rise in amplification of the amplifier 5 which is due solely to the decrease in the screen grid voltage as controlled by the R-C combination of resistor 46 and capacitor 47. In other words, the automatic volume control is effective around a constantly changing operating point, one in which the overall gain is increased exponentially with time, or a gain which over a time interval increases inversely as the attenuation of succeeding wave trains increases. Thus the automatic volume control corrects for the differences between the actual attenuation of wave trains and the exponential rise in the overall amplifier gain. This has the advantage of greatly reducing the load or regulating duty of the automatic volume control feature.

The net effect is that the instantaneous corrections due to the automatic volume control are so small as not to themselves introduce signals which would cause the zero line of the seismogram to change, or to introduce a spurious signal into the seismogram.

Figure 2:
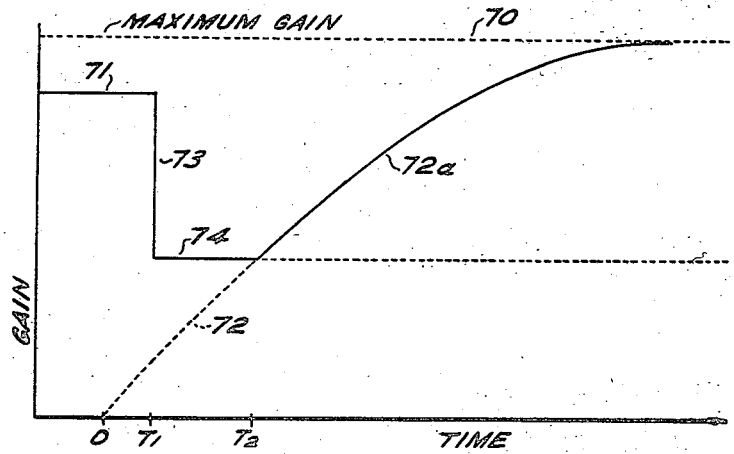
Fig. 2 is a graph illustrating the manner in which the gain of the amplifier is controlled with respect to time.

Referring to Fig. 2, the maximum gain of the amplifier is indicated by the legend "Maximum gain" applied to the broken line 70 which appears on a graph in which gain is plotted as ordinates against time as abscissae. At zero time, the shot instant, it will be observed the amplifier 5 will be operating with its gain reduced as indicated by the horizontal line 71. Of course, its gain will have been reduced prior to zero time because zero time is assumed to be the time at which the dynamite is detonated.

Upon detonation of the dynamite, or upon arrival of seismic waves at an uphole geophone, the resultant initiating signal is applied at 40 to the transformer 41, Fig. 1. The Thyratron 42 fires and the relay 22 immediately opens its contact 21 to initiate the decay of the voltage applied to the screen grid of pentode 15. As this voltage decreases, the plate current of the pentode 15 also decreases. This effect, in the absence of the other provisions of the invention, would cause an increase in the gain of the amplifier 5 as indicated by the broken line 72 of Fig. 2. The actual gain of amplifier 5 remains at the high level as indicated by the horizontal line 71 until the time T₁. At this time, the Thyratron 57 fires and produces immediate operation of relay 36 to complete a circuit from the control grid of triode 16 for application thereto of a relatively high negative bias, the net effect of which is greatly to reduce the amplification of amplifier 5. This substantially instantaneous reduction occurs as indicated by the line 73. The new minimum or low level of amplification is shown by the horizontal line 74.

The substantially instantaneous increase in $E_{de}$, and corresponding decrease in amplification, is accomplished by having available a large voltage $E_{ac}$ at the instant T₁. This large voltage is used to drive the network, consisting of resistor 32 and capacitors 30 and 31, at a rate such that the value of output voltage $E_{de}$, corresponding to the value of gain 74 in Fig. 2, is reached quickly.

Figure 3:
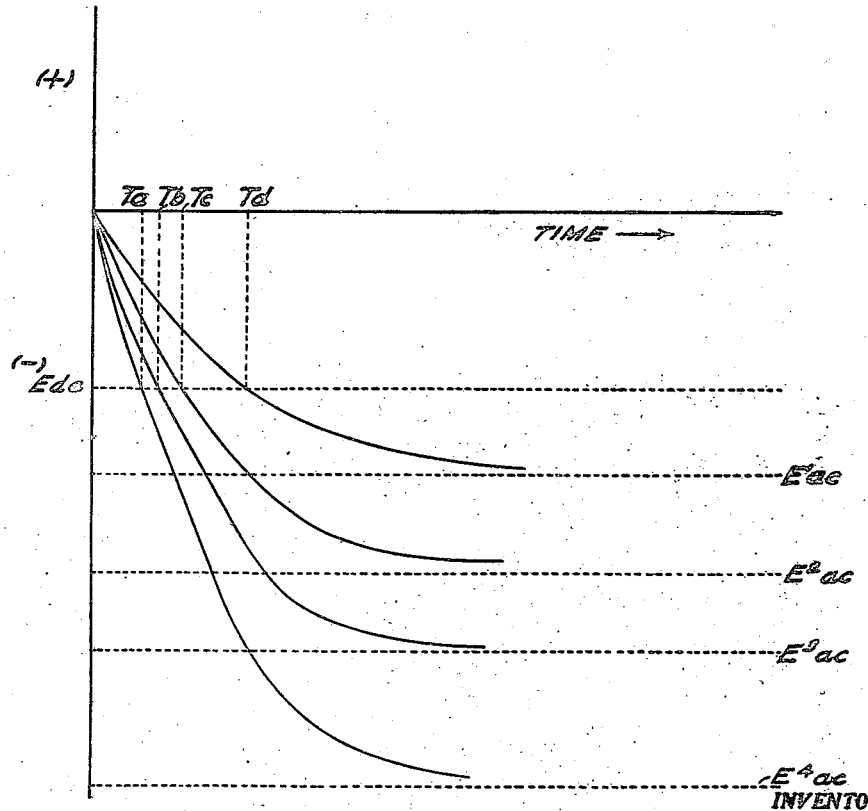
Fig. 3 is a graph illustrating the manner in which a predetermined output voltage, from a fixed time constant network, is reached in shorter times, for greater input voltages.

This is illustrated in Fig. 3, where successively larger constant values of $E_{ac}$ are assumed as being applied to the R-C network. In this illustration the tube or valve 16 is assumed to have zero resistance until zero time, and thereafter to have a value of resistance, as governed by its grid-cathode potential, such that $E_{de}$ is constant. The extensions of the voltage-time curves $E^1_{ac}$ to $E^4_{ac}$ into the negative region below the level of $E_{de}$ correspond with an infinite value of resistance for the tube 16. As the voltage $E_{ac}$ is increased from $E^1_{ac}$ to $E^4_{ac}$ the gain-controlling voltage $E_{de}$ is attained in progressively shorter times as shown at Td and Ta.

In the absence of the tube 16 the voltage $E_{ac}$ would have to be varied between the limits corresponding to the gain values 71 and 74 in Fig. 2. The rate of rise of the voltage $E_{de}$ would be governed solely by the time constant of the R-C network. However, by utilizing the tube or valve 16 in accordance with the invention, the feature of substantially instantaneous reduction in gain at T₁ is possible, regardless of the time-constant of the R-C network. The described action of the tube 16 makes possible the use of high driving voltages $E^1_{ac}$ to $E^4_{ac}$ to produce a fixed output voltage $E_{de}$.

Again referring to Fig. 2, the time interval between 0 and T₁ is chosen long enough to allow for the first arrival of waves at all geophones on the spread. The gain of the amplifier 5 is then greatly reduced to the level indicated by the line 74 in Fig. 2. During this time interval, from T₁ to T₂, the level of amplification is of a value such that direct traveling waves and shallow reflections of large intensity are recorded within the limits of the seismogram. The triode 16 becomes substantially non-conductive at time T₂. Hence, the output from the pentode 15 is thereafter effective to control the increase in the gain of the amplifier 5 when signals of lower level are arriving.

As shown by the curve 72a, the effect of the decreasing voltage on the screen grid is to produce an increase in gain. The amplification or gain rises from its minimum value at 74 to above the intermediate value at 71 and rises until it reaches its maximum value at 70. For reflections from the deeper strata the amplifier 5 will be operating at maximum gain.

It is again emphasized that from time T₂ the output of the pentode 15 will not only depend upon the value of the screen grid voltage but also upon the intensity of the signals applied to the control grid. This automatic volume control feature is effective around a constantly changing amplifier gain; that is, the rise in amplification follows the gain curve 72a and as the gain rises the automatic volume control is effective around a constantly changing operating point, one which moves upwardly along the gain-increasing curve 72a.

Though there is nothing critical about the circuit constants, a number of values are given as exemplary of one form of the invention. The capacitors 30 and 31 may be 0.1 microfarad; capacitors 47, 49 and 50 may be 4.0, 8.0 and 12.0 mfds. respectively, while resistors 32, 26 and 46 may be 0.5 megohm, 0.1 megohm and 50,000 ohms respectively. Triodes of any type used in amplifiers will be satisfactory for the tube 16. The valve or tube 15 should be a sharp cut-off pentode, such as the 6J7.

The master controller is common to each amplifier, there being provided on relays 22 and 36 additional circuit-controlling contacts which serve to control the circuits of each amplifier, as explained in connection with the amplifier 5. As in the case of amplifier 5, the other amplifiers will each be provided with tubes 15 and 16 and circuits corresponding with those below the line 80 which indicates the amplifier chassis in contrast with the master controller chassis M above line 81.

While a preferred embodiment of the invention has been described, it will be understood that further modifications may be made without departing from the spirit and scope of the invention as set forth in the appended claims.

What is claimed is:

1. The combination with an amplifier, of means for controlling the gain of said amplifier comprising a circuit for applying a gain-controlling bias to said amplifier, said circuit including an electric valve, a resistor connected across the output thereof, a second electric valve in shunt therewith, with a filter including a resistor connected therebetween, means for biasing said first valve for flow of current through its output resistor thereby to develop said gain-controlling bias, said second valve and said resistor of said filter cooperating to maintain at a predetermined value said gain-controlling bias over relatively wide variations in output of said first electric valve, said first valve including at least two control electrodes, means connecting one of said control electrodes to the output of said amplifier, means for controlling the biasing potential of the other of said control electrodes including a resistor and a capacitor, and means for rendering said second valve non-conductive thereby to transfer control of said gain-controlling bias to said first-named valve.

2. In a seismic prospecting system having means for producing electrical signals representative of seismic waves, an amplifier for said signals, and a recorder for recording said signals, the combination of an electric valve having an input circuit responsive to said signals and an output circuit including a load resistor, a filter having resistance and capacitance, a second electric valve in shunt with said filter to form a variable resistance, said second valve having a cathode, an anode and a control electrode, means including said filter for varying the bias between said cathode and said grid to change the resistance of said second valve so as to maintain constant the potential difference produced across that valve, and means for applying said potential difference to said amplifier to control the gain thereof.

3. In a seismic prospecting system having means for producing electrical signals representative of seismic waves, an amplifier for said signals, and a recorder for recording said signals, the combination of an electric valve having an input circuit responsive to said signals and an output circuit including a shunting load resistor, a filter having a resistor in series with said output circuit and capacitors in shunt therewith, a second electric valve in shunt with said filter to form a variable resistance thereacross, said second valve having a cathode, an anode and a control electrode, means including said filter for varying the bias between said cathode and grid thereby to vary the resistance of said second valve so as to maintain substantially constant the potential difference produced across that valve, and means for applying said potential difference to said amplifier to control the gain thereof.

4. The combination with an amplifier, of a gain-controlling system comprising an electric valve having a control grid and a cathode connected in an input circuit responsive to signals from said amplifier and having its anode and cathode connected in an output circuit, a source of anode supply, a resistor connecting the positive side of said source to the anode of said valve, a second electric valve having its anode connected to said positive source of supply and to ground, means including a second resistor for connecting the cathode of said second valve to the anode of said first valve for producing a bias between the grid and cathode of said second valve to vary the conductivity and resistance of said second valve, and means for applying a bias derived from between said cathode and anode of said second valve to said amplifier for controlling the gain thereof.

5. The combination set forth in claim 4 in which there are provided means for rendering said second valve substantially non-conductive to eliminate the effect of its variable resistance upon said amplifier.

6. The combination set forth in claim 4 in which there are provided means for rendering said second valve substantially non-conductive to eliminate the effect of its variable resistance upon said amplifier so that the bias thereafter applied to said amplifier is largely dependent upon the voltage across said output circuit, and means operable as a function of time gradually to change the output of said first valve to vary as a function of time the gain of said amplifier.

7. The combination with an amplifier, of a gain-controlling system comprising an electric valve having a control grid and a cathode connected in an input circuit responsive to signals from said amplifier and having its anode and cathode connected in an output circuit, a source of anode supply, a resistor connecting the positive side of said source to the anode of said valve, a second electric valve having its anode connected to said positive source of supply and to ground, means including a second resistor for connecting the cathode of said second valve to the anode of said first valve, capacitive means, means connecting said capacitive means in shunt with respect to said second valve, means for applying to said amplifier the voltage drop across said second valve as a gain-controlling bias therefor, and means for initially rendering said second valve conductive to provide a uniform gain-controlling bias and thereafter rendering that valve non-conductive to apply a variable gain-controlling bias to said amplifier.

8. The combination set forth in claim 7 in which there is provided means for producing an initiating signal and in which said means for rendering said second valve non-conductive comprises means operable a predetermined time interval after production of said initiating signal.

9. The combination with an amplifier of seismic signals of a gain-controlling system therefor comprising an electric valve having a control grid and a cathode connected in an input circuit responsive to seismic signals from said amplifier and having its anode and cathode connected in an output circuit, a source of anode supply, a resistor connecting the positive side of said source to the anode of said valve, means for producing over a predetermined time interval a gain-suppressing bias of substantially constant magnitude comprising a second electric valve having an anode connected to said positive source of supply and to ground, means including a second resistor for connecting the cathode of said second valve to the anode of said first valve, capacitors connected in shunt with said second valve, one on one side and one on the other side of said second resistor, and means for controlling the bias on said second-named valve to render it non-conductive after expiration of said predetermined time interval.

EDWIN J. SHIMEK.
WILLIAM B. HEMPHILL.